(12) United States Patent
Jeng et al.

(10) Patent No.: US 7,869,491 B2
(45) Date of Patent: Jan. 11, 2011

(54) DATA TRANSCEIVER AND METHOD THEREOF

(75) Inventors: Iuan-Tsung Jeng, Taipei (TW); Wen-Yu Tseng, Taipei (TW)

(73) Assignee: VIA Technologies, Inc., Taipei (TW)

( * ) Notice: Subject to any disclaimer, the term of this patent is extended or adjusted under 35 U.S.C. 154(b) by 910 days.

(21) Appl. No.: 11/798,280

(22) Filed: May 11, 2007

(65) Prior Publication Data
US 2008/0010565 A1  Jan. 10, 2008

(30) Foreign Application Priority Data
Jun. 20, 2006  (TW) ................. 95122177 A

(51) Int. Cl.
*H04B 1/38* (2006.01)
*H04L 27/00* (2006.01)
*H04J 3/06* (2006.01)

(52) U.S. Cl. .............. 375/219; 375/295; 370/503

(58) Field of Classification Search ........... 375/219, 375/220, 295, 316, 354, 362, 365; 370/464, 370/350, 473, 503; 714/700
See application file for complete search history.

(56) References Cited

U.S. PATENT DOCUMENTS

| 5,373,508 | A  | * | 12/1994 | Guliani ............... 714/712 |
| 6,260,167 | B1 | * | 7/2001  | Lo et al. ............ 714/744 |
| 6,771,671 | B1 |   | 8/2004  | Fields et al. |
| 2003/0006813 | A1 | | 1/2003  | Ishimi |
| 2004/0022238 | A1 | | 2/2004  | Kimmitt |
| 2004/0028156 | A1 | * | 2/2004  | Sefidvash et al. ........ 375/346 |

* cited by examiner

*Primary Examiner*—Betsy L Deppe
(74) *Attorney, Agent, or Firm*—Birch, Stewart, Kolasch & Birch, LLP

(57) ABSTRACT

A data transceiver and method thereof are disclosed. The data transceiver generates a gated control signal according to a valid signal and a clock signal. The packets are outputted according to the gated control signal.

20 Claims, 8 Drawing Sheets

FIG. 6 is a flow chart showing a method according to the embodiment of the invention.

DATA TRANSCEIVER AND METHOD THEREOF

BACKGROUND OF THE INVENTION

1. Field of Invention

The invention relates to a data transceiver, and, in particular, to a packet transmitted in a data transceiver.

2. Related Art

Data transceivers with high speed serial transmission are widely used in the computers and communication systems.

As shown in FIG. 1, a conventional data transceiver 1 is connected between the electrical physical layer 20 and data link layer 21.

For example, a plurality of packets PAKs from the electrical physical layer 20 are respectively transmitted in the channels of data transceiver 1. The packet PAK may be a TLP (Transaction Layer Packet) or a DLLP (Data link layer packet) in a PCI Express system. Due to the transmission differences exist within the channels, the packets PAKs should be respectively delayed for a certain of delay time for eliminating the transmission differences. After the delay transmission, the packets PAKs are synchronously output to the data link layer 21.

However, the power is consumed due to the delay transmission, especially while a logic idle symbol (i.e. defined as "00") exists in the packet. The logic idle symbol will not be actually executed, but it still should be processed to maintain the normal operation of the data transceiver 1.

Consequently, it is one of the important subjects to provide a data transceiver with low power consumption.

SUMMARY OF THE INVENTION

In view of the foregoing, the invention is to provide a data transceiver with reduced power consumption.

According to one embodiment of the present invention, a data transceiver is disclosed. The data transceiver asserts a valid signal and generates a gated control signal according to the valid signal and a clock signal. The packets are outputted according to the gated control signal.

According to another embodiment of the present invention, a transmission method for transmitting packets is disclosed. The transmission method is to generate a valid signal and a gated control signal. Therefore, the packets are outputted according to the gated control signal.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
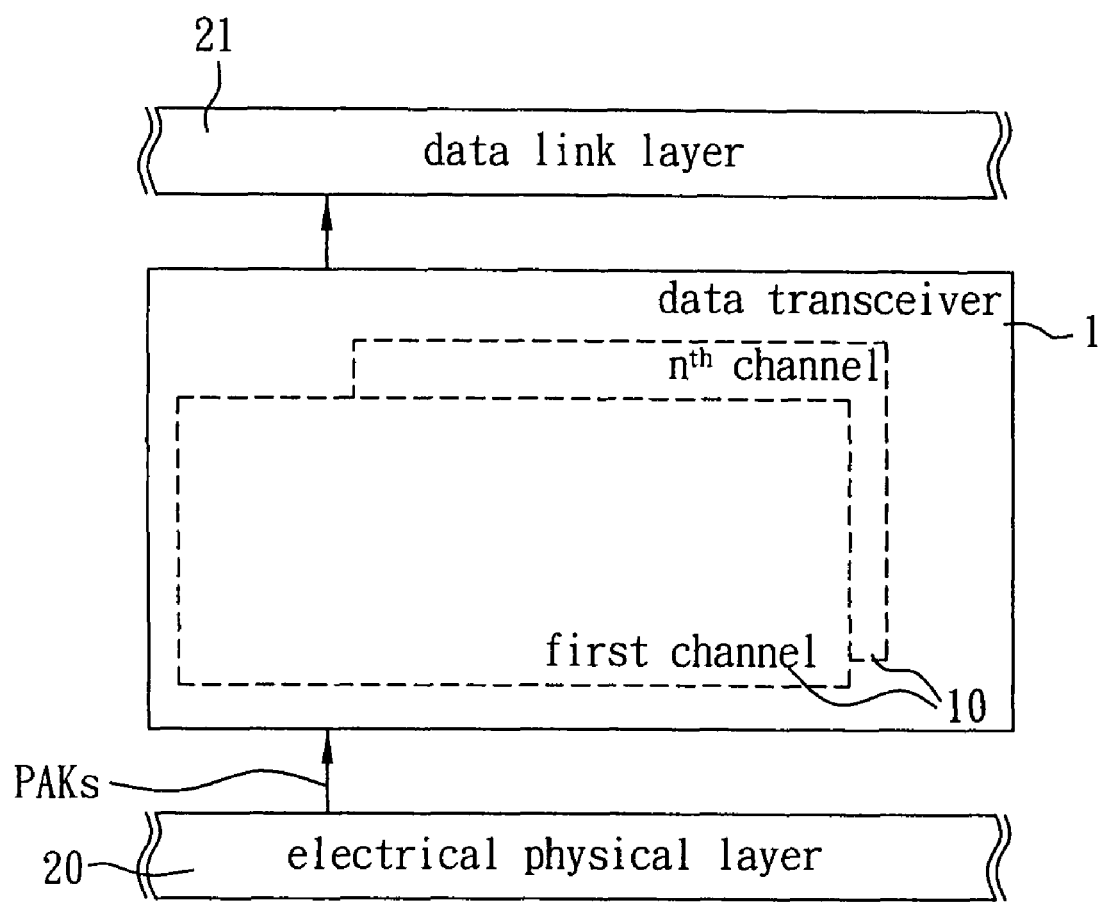
FIG. 1 is a schematic illustration showing a data transceiver.
Figure 2:
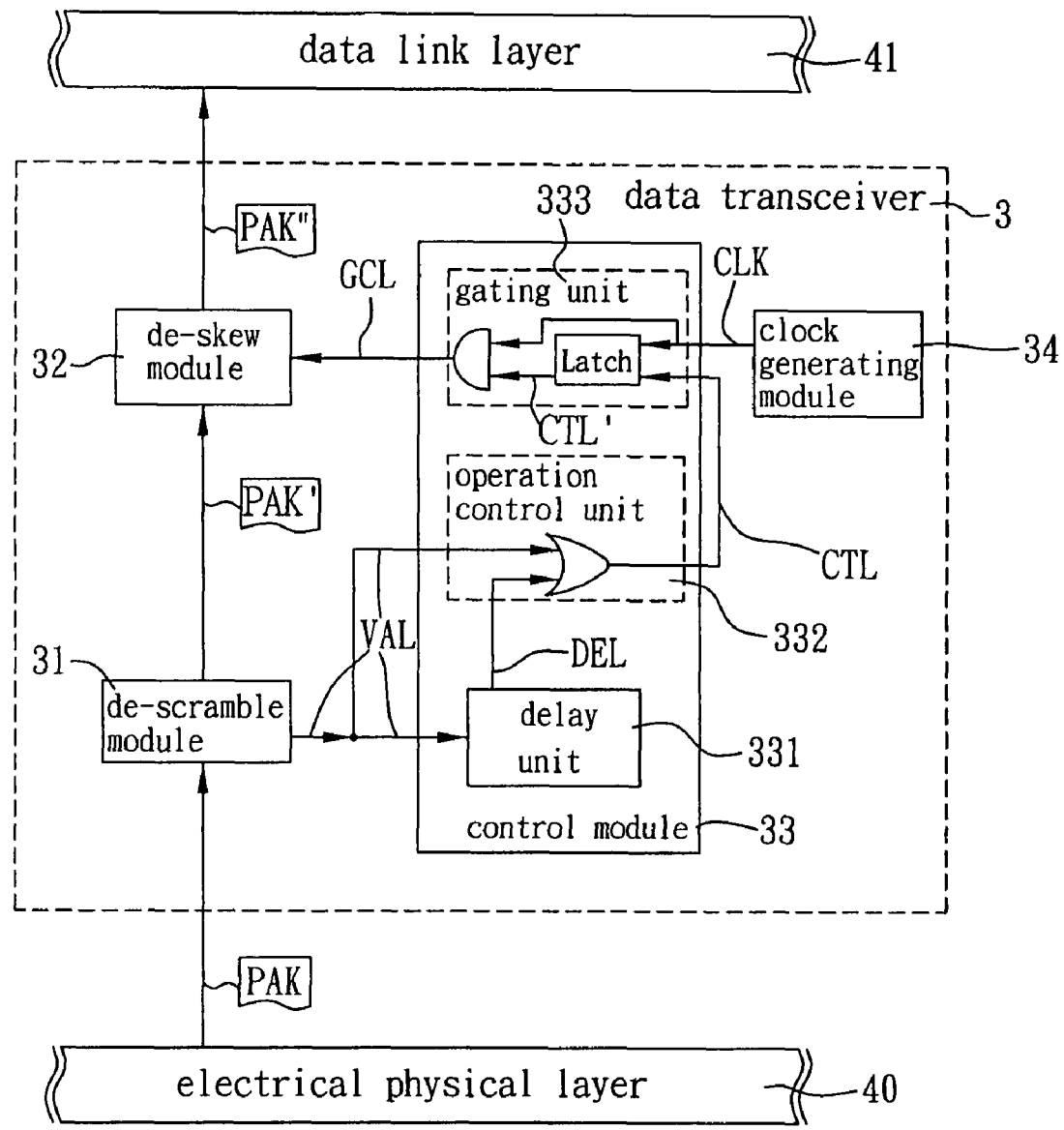
FIG. 2 is a schematic illustration showing a data transceiver according to an embodiment of the invention.

FIG. 2 shows a data transceiver 3 having a single channel according to one embodiment of the invention. The data transceiver 3 includes a de-scramble module 31, a de-skew module 32 and a control module 33.

The de-scramble module 31 receives one packet PAK, having at least one symbol, from electrical physical layer 40 and de-scrambles the packet PAK as a de-scrambled packet PAK'. Then, the de-scramble module 31 asserts a valid signal VAL according to the symbols of the de-scrambled packet PAK'. In the present invention, the valid signal is enabled while the symbol of the packet PAK' is valid. The de-scrambled packet PAK' is transmitted to the de-skew module 32. The control module 33 is coupled to the de-scramble module 31 and receives the valid signal VAL from the de-scramble module 31. The control module 33 includes a delay unit 331, an operation control unit 332 and a gated control unit 333 and generates a gated control signal GCL according to the valid signal VAL and a clock signal CLK. The de-skew module 32 de-skews the de-scrambled packet PAK' as a de-skewed packet PAK" according to the gated control signal GCL. Finally, the de-skewed packet PAK" is outputted to data link layer 41.

Figure 3:
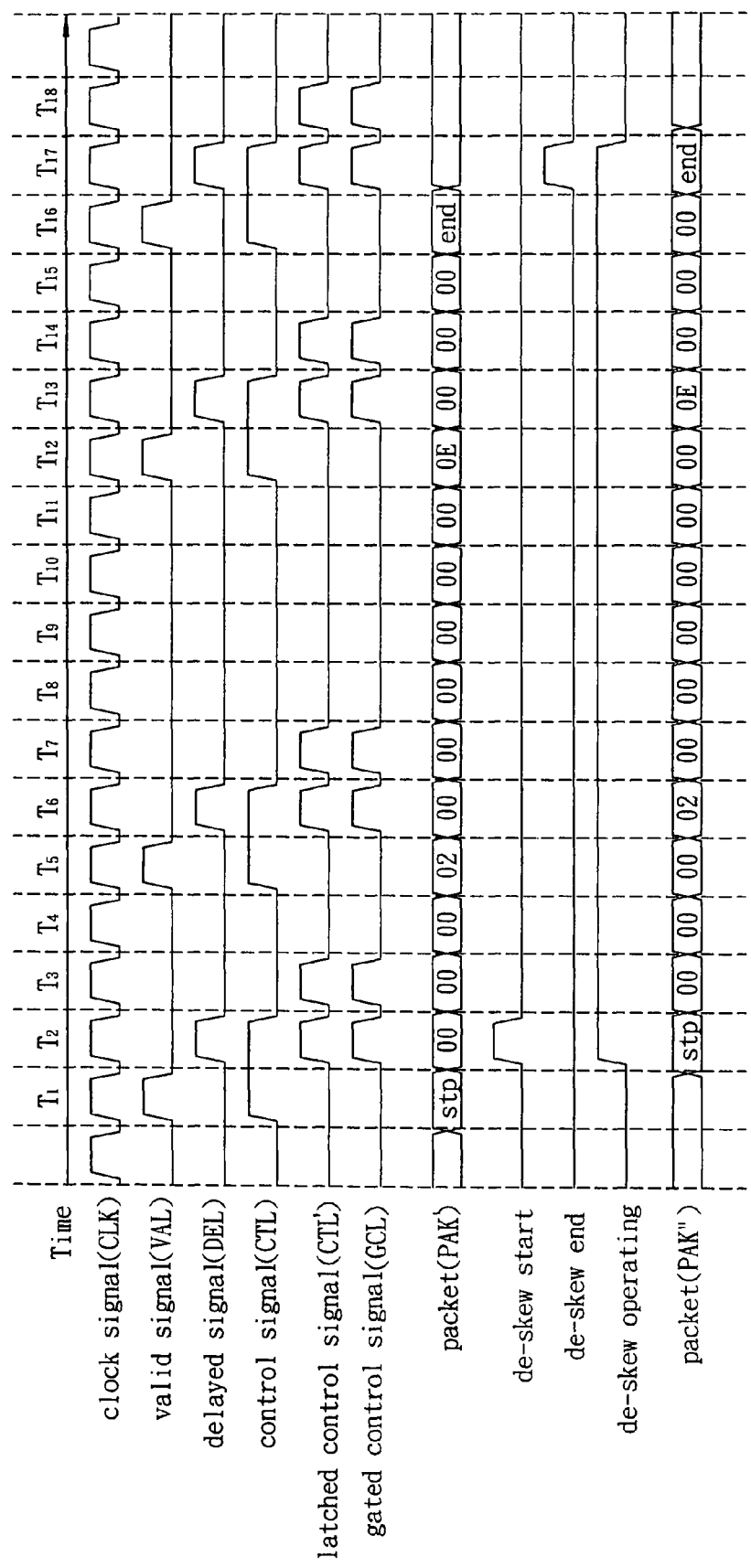
FIG. 3 is a schematic illustration showing the timing relationship according to FIG. 2.

FIG. 3 is a schematic illustration showing a timing relationship for detail description of the operations of the data transceiver 3 in FIG. 2.

First, the de-scramble module 31 receives the packet PAK, having at least one symbol, from the electrical physical layer 40. In the present invention, the packet PAK may be a TLP (Transaction Layer Packet) or a DLLP (Data link layer packet) of a PCI Express system. The de-scramble module 31 de-scrambles the packet PAK as the de-scrambled packet PAK' and detects whether the symbol of the packet PAK' is valid. Furthermore, the de-scramble module 31 asserts a valid signal VAL according to whether the symbol is valid. The valid signal VAL is enabled while the symbol is valid and disabled while the symbol is invalid. In the embodiment, while the symbol is the logic idle symbol, defined as "00" that is regarded as an invalid symbol. On the other hand, the symbol excepting for the logic idle symbol is regarded as a valid symbol. As a result, as shown in FIG. 3, the symbols—"stp", "02", "0E" and "end" are regarded as the valid symbols. Therefore, the valid signal VAL is enabled at $T_1$, $T_5$, $T_{12}$ and $T_{16}$ according to the valid symbols—"stp", "02", "0E" and "end".

The delay unit 331 is connected to the de-scramble module 31 for delaying the valid signal VAL for a predetermined delay time according to a skew amount and thus generates a delay signal DEL. The skew is caused due to the transmission difference between channels, and the skew amount is defined as the maximum transmission difference within the channels of the data transceiver 3. Since the data transceiver 3 is a single channel data transceiver, the skew amount of the data transceiver 3 is zero. As a result, the delay unit 331 delays the valid signal VAL for a predetermined delay time of 1 T. More specifically, the maximum of the predetermined delay time is equal to be the skew amount plus one delay time unit 1 T. For example, assume the skew amount is 1 T, the maximum of the predetermined delay time is 2 T and the delay unit 331 delays the valid signal VAL for 1 T and 2 T to generate two delay signals DEL. It is to be noted that if the predetermined delay time is insufficient, the de-skew module 32 may not properly transmit the de-skewed packet PAK". In this embodiment, as shown in FIG. 3, the delay signal DEL is enabled at $T_2$, $T_6$, $T_{13}$ and $T_{17}$.

The operation control unit 332, such as an OR gate, is connected to the delay unit 331 and the de-scramble module 31 for generating a control signal CTL according to the delay signal DEL and the valid signal VAL. In the embodiment, while either the delay signal DEL or the valid signal VAL is enabled, the control signal CTL is enabled. Thus, as shown in FIG. 3, the control signal CTL is enabled at $T_1$, $T_2$, $T_5$, $T_6$, $T_{12}$, $T_{13}$, $T_{16}$ and $T_{17}$.

The gating unit 333, such as an AND gate and a latch, connected to the operation control unit 332 and the de-skew module 32. The gating unit 333 generates a gated control signal GCL according to the control signal CTL and a clock CLK generated from a clock generating module 34. In the embodiment, the control signal CTL is firstly latched according to the clock signal CLK for generating a latched control signal CTL'. Then, the gated control signal GCL is generated according to the latched control signal CTL' and the clock signal CLK. The gated control signal GCL is enabled while both of the latched control signal CTL' and the clock signal CLK are enabled. Therefore, as shown in FIG. 3, the latched control signal CTL' is enabled at $T_2$, $T_3$, $T_6$, $T_7$, $T_{13}$, $T_{14}$, $T_{17}$ and $T_{18}$, and the gated control signal GCL is enabled at $T_2$, $T_3$, $T_6$, $T_7$, $T_{13}$, $T_{14}$, $T_{17}$ and $T_{18}$.

The de-skew module 32 de-skews the packet PAK' from the de-scramble module 31 as the de-skewed packet PAK" according to the gated control signal GCL, and then outputs the packet PAK" to a data link layer 41. As shown in FIG. 3, the de-skew module 32 outputs the de-skewed packet PAK" to the data link layer 41 at $T_2$, $T_3$, $T_6$, $T_7$, $T_{13}$, $T_{14}$, $T_{17}$ and $T_{18}$.

The following shows the operations of a data transceiver having a plurality of channels according to another embodiment in the invention.

Figure 4:
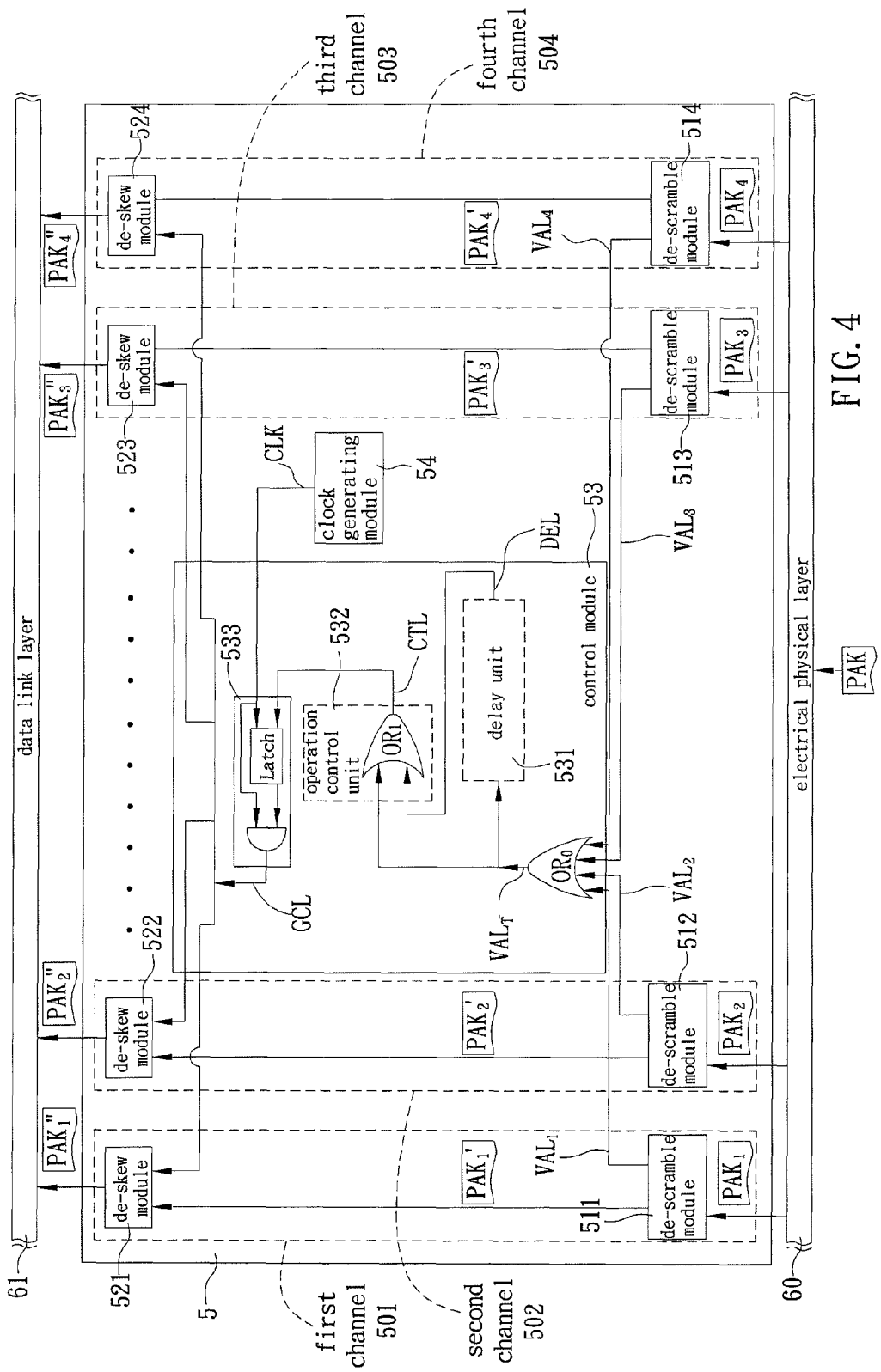
FIG. 4 is a schematic illustration showing a data transceiver according to another embodiment of the invention.

FIG. 4 is an example showing a data transceiver 5 having four channels. The data transceiver 5 includes four channels 501~504 and a control module 53. Each of the channels 501~504 respectively includes a de-scramble module 511~514 and a de-skew module 521~524. The channels 501~504 of the data transceiver 5 respectively transmit packets $PAK_1$~$PAK_4$ from electrical physical layer 60 to data link layer 61. The packets $PAK_1$~$PAK_4$ may be a TLP or a DLLP (Data link layer packet) of the PCI Express system. Assume the first packet $PAK_1$ is transmitted in channel 501, the second packet $PAK_2$ is transmitted in channel 502, the third packet $PAK_3$ is transmitted in channel 503, and the fourth packet $PAK_4$ is transmitted in channel 504.

As described above, the de-scramble modules 511~514 respectively de-scramble the packets $PAK_1$~$PAK_4$ as the de-scrambled packets $PAK_1'$~$PAK_4'$ and enable sub-valid signals $VAL_1$~$VAL_4$ according to whether the symbols of the packets $PAK_1'$~$PAK_4'$ are valid. It's the same that the symbol is valid excepting for the logic idle symbol.

The control module 53, including a delay unit 531, an operation control unit 532 and a gated control unit 533, is connected to the de-scramble modules 511~514 and the de-skew modules 521~524 and generates the gated control signal GCL according to the sub-valid signals $VAL_1$~$VAL_4$ and a clock signal CLK. Then, the de-skew modules 521~524 respectively de-skew the de-scrambled packets $PAK_1'$~$PAK_4'$ as the de-skewed packets $PAK_1''$~$PAK_4''$ according to the gated control signal GCL.

In the embodiment, the data transceiver 5 further includes an OR gate $OR_0$ connected to the de-scramble modules 511~514 for receiving the sub-valid signals $VAL_1$~$VAL_4$ and generating a valid signal $VAL_T$ accordingly. In the embodiment, the valid signal $VAL_T$ is enabled while any one of the sub-valid signals $VAL_1$~$VAL_4$ is enabled. Then, the valid signal $VAL_T$ is transmitted to the delay unit 531 and the operation control unit 532. The delay unit 531 delays the valid signal $VAL_T$ for a predetermined delay time to generate at least one delay signals DEL according to a skew amount. In the invention, each of the delay signals has a different predetermined delay time, and the maximum of the predetermined delay time is equal to the skew amount plus one delay time unit (i.e. 1 T). The skew amount is substantially equal to the maximum transmission difference between the channels 501~504. For example, assume the skew amount is 1 T, the number of the delay signal DEL is 2. The difference between each delay signal DEL is substantially equal to one delay time unit T.

The operation control unit 532, such as an OR gate $OR_1$, receives the at least one delay signal DEL and the valid signal $VAL_T$ and generates a control signal CTL accordingly. In the embodiment, the control signal CTL is enabled while either the delay signal DEL or the valid signal $VAL_T$ is enabled.

The gated control unit 533, such as an AND gate and a latch, receives the control signal CTL and a clock signal CLK generated from the clock generating module 54 and generate a gated control signal GCL accordingly. The control signal CTL is firstly latched according to the clock signal CLK to generate a latched control signal CTL'. Then, the gated control signal GCL is generated according to the latched control signal CTL' and the clock signal CLK. In the embodiment, the gated control signal GCL is enabled while both of the clock signal CLK and the gated signal CTL' are enabled.

The de-skew modules 521~524 respectively receive the de-scrambled packets $PAK_1'$~$PAK_4'$ from the de-scramble modules 511~514 de-skew the de-scrambled packets $PAK_1'$~$PAK_4'$ as the de-skewed packets $PAK_1''$~$PAK_4''$ according to the gated control signal GCL. Finally, output the de-skewed packets $PAK_1''$~$PAK_4''$ to data link layer 61, respectively.

Figure 5A:
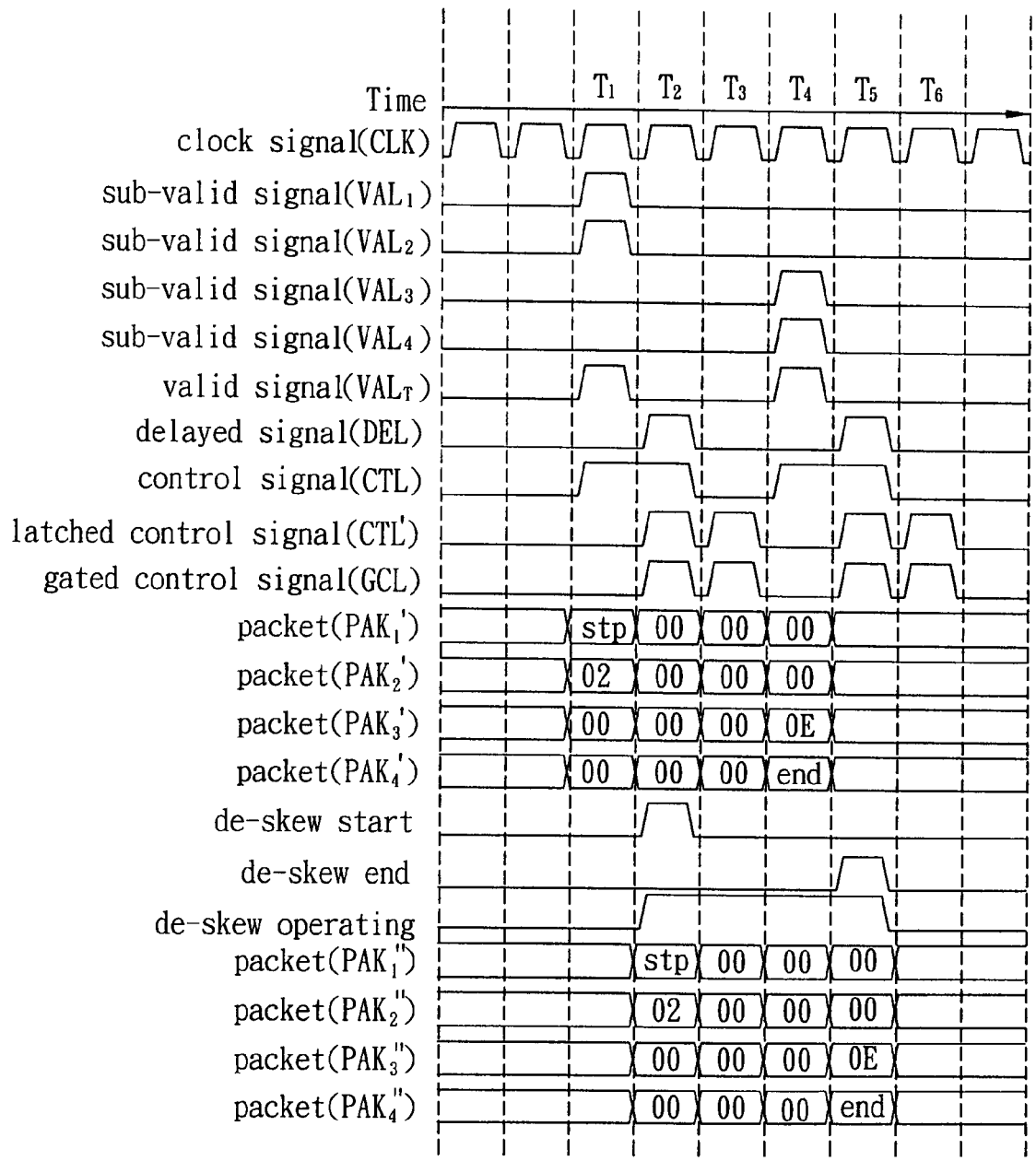
FIG. 5A is a schematic illustration showing one timing relationship according to FIG. 4.
Figure 5B:
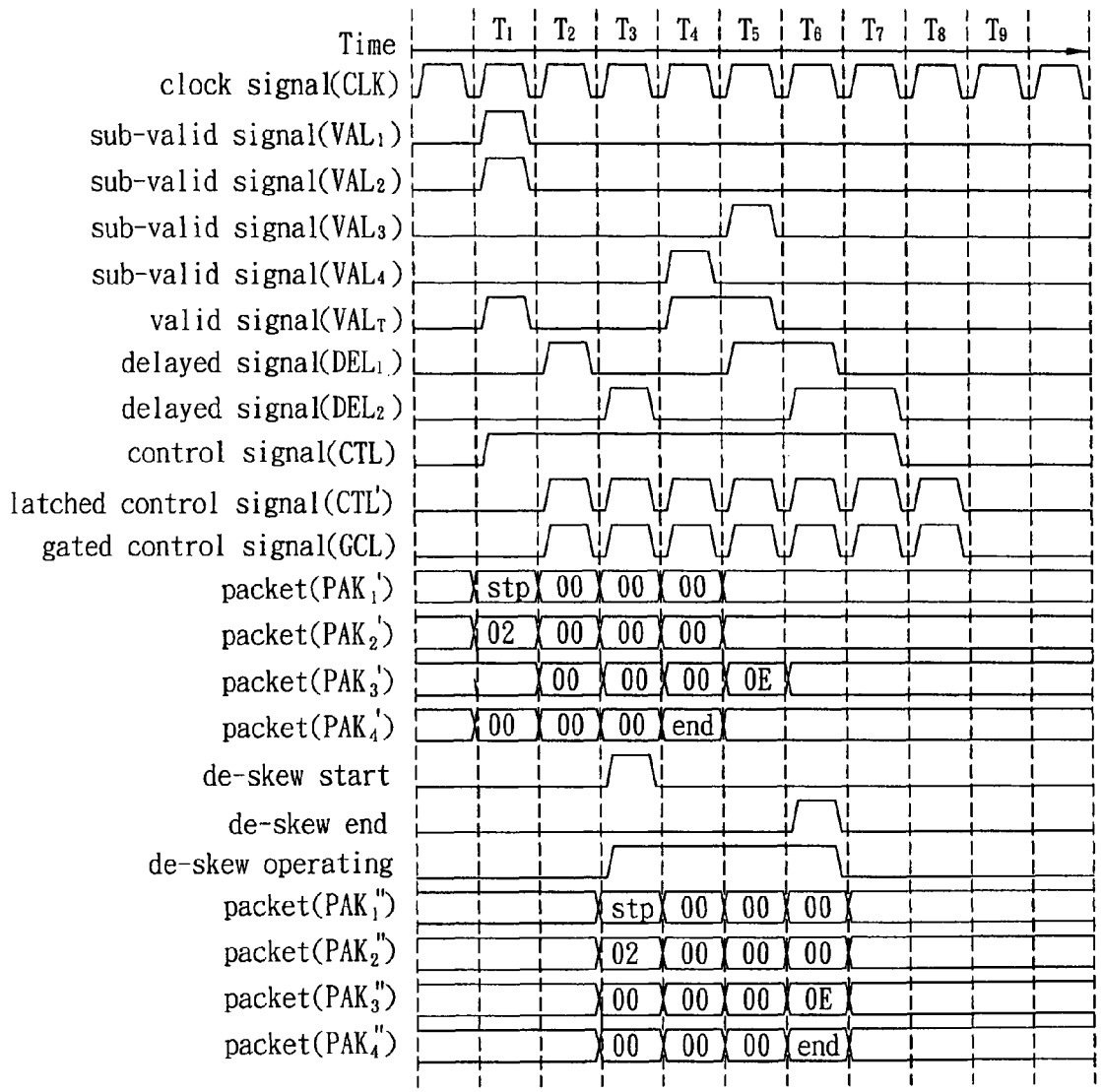
FIG. 5B is a schematic illustration showing another timing relationship according to FIG. 4.
Figure 5C:
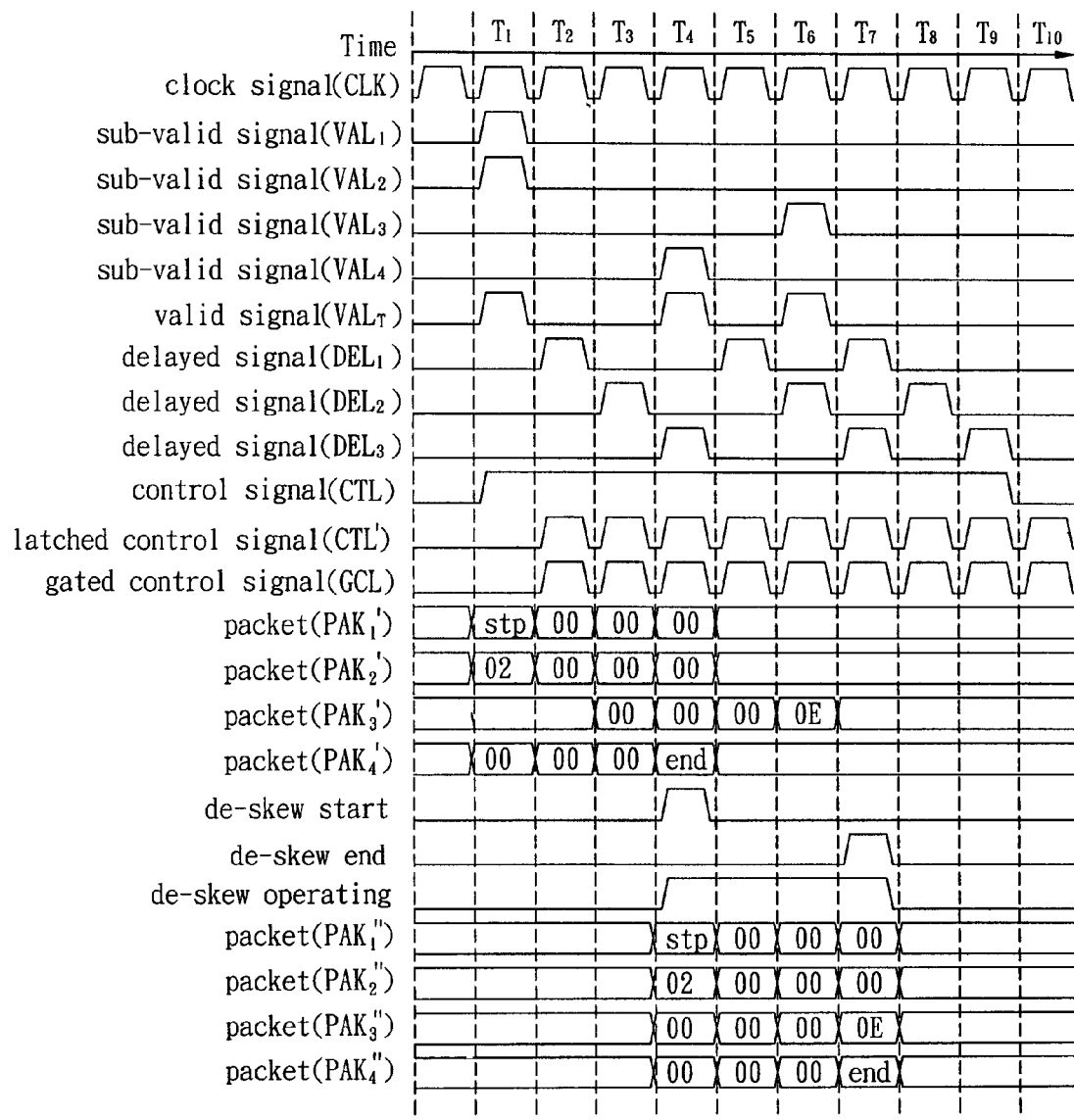
FIG. 5C is a schematic illustration showing still another timing relationship according to FIG. 4.

FIGS. 5A to 5C are schematic illustrations showing timing relationship for detail description the operations of the data transceiver 5 in FIG. 4.

FIG. 5A shown one embodiment of the data transceiver 5 in the present invention. Assume there is no transmission difference within the channels 501~504, the packets $PAK_1$~$PAK_4$ are thus respectively transmitted and de-scrambled as the de-scrambled packets $PAK_1'$~$PAK_4'$ in the channels 501~504 during time $T_1$ to $T_4$. Then, the corresponding sub-valid signals $VAL_1$~$VAL_4$ are respectively asserted. More specifically, the sub-valid signals $VAL_1$ and $VAL_2$ are enabled at $T_1$ due to the valid symbols "stp" and "02", and the sub-valid signals $VAL_3$ and $VAL_4$ are enabled at $T_4$ due to the valid symbol "0E" and "end". Since the sub-valid signals $VAL_1$ and $VAL_2$ are enabled at $T_1$ and the sub-valid signals $VAL_3$ and $VAL_4$ are enabled at $T_4$. Accordingly, the valid signal $VAL_T$ is enabled at $T_1$ and $T_4$. As described above, assume there is no transmission difference within channels 501~504, the skew amount is 0 T. As a result, the delay unit 531 delays the valid signal $VAL_T$ for the predetermined amount of 1 T to generate a delay signal DEL. As shown in FIG. 5A, the delay signal DEL is enabled at $T_2$ and $T_5$. The control signal CTL is enabled during $T_1$~$T_2$ and $T_4$~$T_5$. The gated control signal CTL' is accordingly enabled at time $T_2$, $T_3$, $T_5$ and $T_6$. Then, the gated control signal GCL is enabled at $T_2$, $T_3$, $T_5$ and $T_6$. According to the gated control signal GCL, the de-scrambled packets $PAK_1'\sim PAK_4'$ are de-skewed as the de-skewed packets $PAK_1''\sim PAK_4''$ during $T_2$ to $T_5$. Finally, the de-skewed packets $PAK_1\sim PAK_4''$ are simultaneously output.

FIG. 5B shown another embodiment of the data transceiver 5 in the present invention. Assume there is IT transmission difference existed in one channel, such as channel 503. Therefore, the packets $PAK_1$, $PAK_2$ and $PAK_4$ are respectively transmitted and de-scrambled as the de-scrambled packets $PAK_1'$, $PAK_2'$ and $PAK_4'$ in the channels 501, 502 and 504 during time $T_1$ to $T_4$; and the packet $PAK_3$ is transmitted and de-scrambled as the packets $PAK_3'$ in the channels 503 during time $T_2$ to $T_5$. Then, the corresponding sub-valid signals $VAL_1\sim VAL_4$ are respectively asserted. More specifically, the sub-valid signals $VAL_1$ is and $VAL_2$ are enabled at $T_1$ due to the valid symbols "stp" and "02", the sub-valid signals $VAL_4$ are enabled at $T_4$ due to the valid symbol "end", and the sub-valid signals $VAL_3$ are enabled at $T_5$ due to the valid symbol "0E". Accordingly, the valid signal $VAL_T$ is enabled at $T_1$, $T_4$ and $T_5$. As described above, assume there is 1 T transmission difference existed in channel 503, the skew amount is 1 T. As a result, the delay unit 531 respectively delays the valid signal $VAL_T$ for the predetermined amounts of 1 T and 2 T to generate a first delay signal $DEL_1$ and a second delay signal $DEL_2$. As shown in FIG. 5B, the first delay signal $DEL_1$ is enabled at $T_2$, $T_5$ and $T_6$, and the second delay signal $DEL_2$ is enabled at $T_3$, $T_6$ and $T_7$. The control signal CTL is enabled during $T_1\sim T_7$. The gated control signal CTL' is accordingly enabled at time $T_2$, $T_3$, $T_5$ and $T_6$. Then, the gated control signal is enabled at $T_2$, $T_3$, $T_4$, $T_5$, $T_6$, $T_7$ and $T_8$. Then, the gated control signal GCL is enabled at $T_2$, $T_3$, $T_4$, $T_5$, $T_6$, $T_7$ and $T_8$. According to the gated control signal GCL, the de-scrambled packets $PAK_1'\sim PAK_4'$ are de-skewed as the de-skewed packets $PAK_1''\sim PAK_4''$ during $T_3\sim T_6$. Finally, the de-skewed packets $PAK_1''\sim PAK_4''$ are simultaneously output.

FIG. 5C shown another embodiment of the data transceiver 5 in the present invention. Assume there is 2 T transmission difference existed in one channel, such as channel 503. Therefore, the packets $PAK_1$, $PAK_2$ and $PAK_4'$ are respectively transmitted and de-scrambled as the packets $PAK_1'$, $PAK_2'$ and $PAK_4'$ in the channels 501, 502 and 504 during time $T_1\sim T_4$, and the packet $PAK_3$ is transmitted and de-scrambled as the packet $PAK_3'$ in the channels 503 during time $T_3\sim T_6$. Then, the corresponding sub-valid signals $VAL_1\sim VAL_4$ are respectively asserted. More specifically, the sub-valid signals $VAL_1$ is and $VAL_2$ are enabled at $T_1$ due to the valid symbols "stp" and "02", the sub-valid signals $VAL_4$ are enabled at $T_4$ due to the valid symbol "end", and the sub-valid signals $VAL_3$ are enabled at $T_6$ due to the valid symbol "0E". Accordingly, the valid signal $VAL_T$ is enabled at $T_1$, $T_4$ and $T_6$. As described above, assume there is 2 T transmission difference existed in channel 503, the skew amount is 2 T. As a result, the delay unit 531 respectively delays the valid signal $VAL_T$ for the predetermined amounts of 1 T, 2 T and 3 T to generate a first delay signal $DEL_1$, a second delay signal $DEL_2$ and a third delay signal $DEL_3$. As shown in FIG. 5Cs, the first delay signal $DEL_1$ is enabled at $T_2$, $T_5$ and $T_7$, the second delay signal $DEL_2$ is enabled at $T_3$, $T_6$ and $T_8$, and the third delay signal $DEL_3$ is enabled at $T_4$, $T_7$ and $T_9$. The control signal CTL is enabled during $T_1\sim T_9$. The gated control signal CTL' is accordingly enabled at time $T_2$, $T_3$, $T_5$ and $T_6$. Then, the gated control signal is enabled at $T_2$, $T_3$, $T_4$, $T_5$, $T_6$, $T_7$, $T_8$, $T_9$ and $T_{10}$. Then, the gated control signal GCL is enabled at $T_2$, $T_3$, $T_4$, $T_5$, $T_6$, $T_7$, $T_8$, $T_9$ and $T_{10}$. According to the gated control signal GCL, the de-scrambled packets $PAK_1'\sim PAK_4'$ are de-skewed as the de-skewed packets $PAK_2''\sim PAK_4''$ during $T_4\sim T_7$. Finally, the de-skewed packets $PAK_1''\sim PAK_4''$ are simultaneously output.

Figure 6:
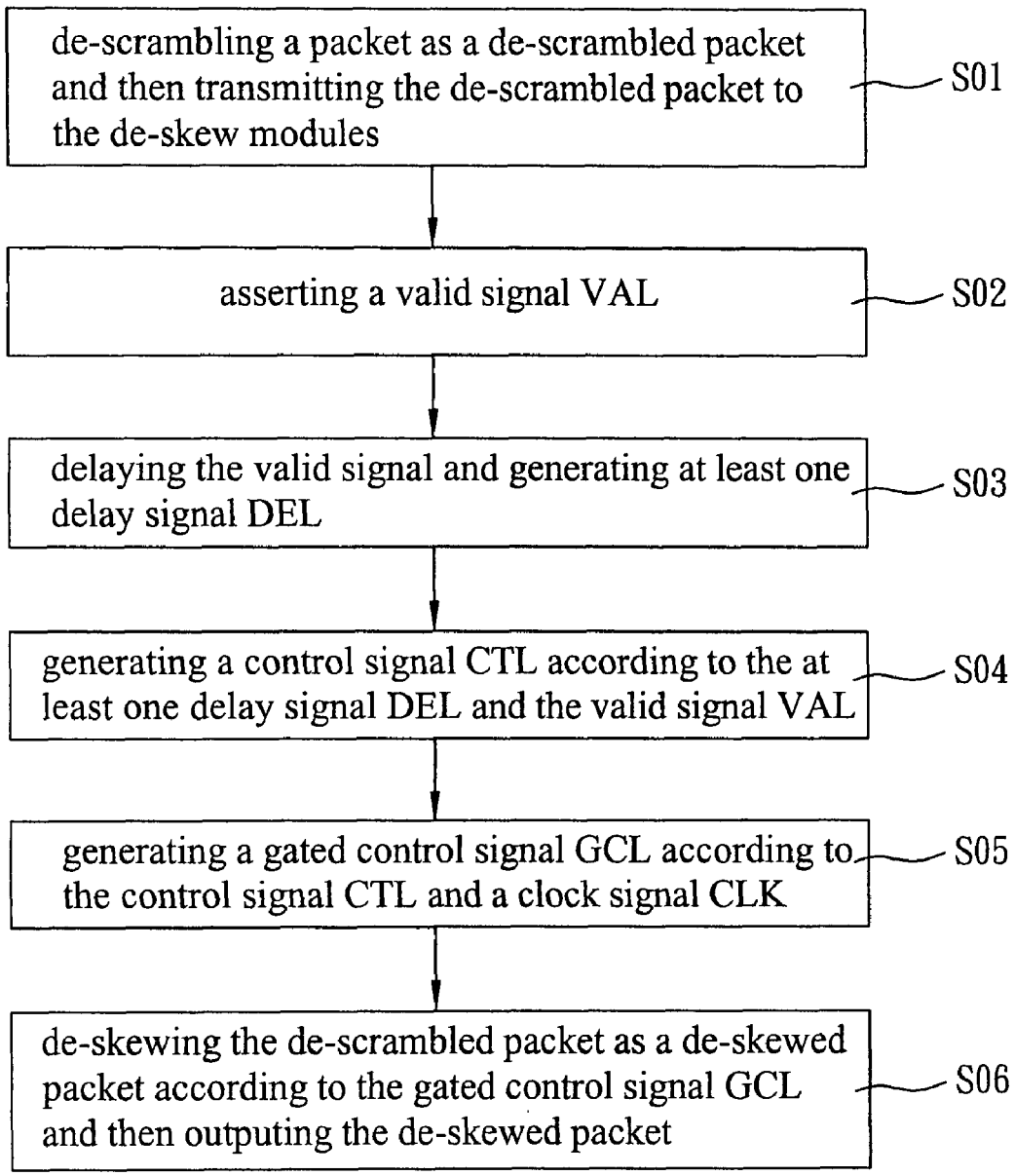
FIG. 6 is a flow chart showing a method according to the embodiment of the invention.

FIG. 6 is a flow chart showing a transceiving method according to the embodiment of the invention. In step S01, a de-scramble module de-scrambles a packet as a de-scrambled packet and then transmits the de-scrambled packet to the de-skew modules. In step S02, the de-scramble module asserts a valid signal VAL according to the symbol of the packet. In step S03, a delay unit delays the valid signal according to a skew amount within the channels to generate at least one delay signal DEL. In step S04, the operation control unit generates a control signal CTL according to the at least one delay signal and the valid signal VAL. In step S05, a gated control unit generates a gated control signal GCL according to the control signal CTL and a clock signal CLK. In step S06, the de-skew module de-skews the de-scrambled packet as a de-skewed packet according to the gated control signal GCL and then outputs the de-skewed packet.

In summary, the operating clock in the data transceiver of the present invention is provided only while the symbol of the packet is valid. On the other hand, while the symbol of the packet is invalid (i.e. logic idle symbol), the operating clock is suspended. Therefore, the power consumption is reduced and the packet is properly transmitted and received. Besides for four channels as disclosed above, the data transceiver of the invention may also have any amount of channels and accordingly the same amount of de-scramble module and the de-skew module.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A data transceiver, comprising:
   at least one channel, each channel comprising:
   a de-scramble module for de-scrambling a packet, having at least one symbol, as a de-scrambled packet and asserting a valid signal, and
   a de-skew module coupled to the de-scramble module for de-skewing the de-scrambled packet as a de-skewed packet according to a gated control signal; and
   a control module coupled to the de-scramble module and the de-skew module for generating the gated control signal according to the valid signal and a clock signal.

2. The data transceiver according to claim 1 further comprising:
   a clock generating module coupled to the control module for generating the clock signal.

3. The data transceiver according to claim 1 wherein the valid signal is enabled while the symbol is valid.

4. The data transceiver according to claim 3 wherein the symbol is valid except for a logic idle symbol occurs.

5. The data transceiver according to claim 4 wherein the logic idle symbol is defined as "00".

6. The data transceiver according to claim 1 wherein the control module comprises:
   a delay unit coupled to the de-scramble module, delaying the valid signal to generate at least one delay signal;
   an operation control unit coupled to the de-scramble module and the delay unit, generating a control signal according to the valid signal and the delay signal; and a gated control unit coupled to the operation control unit and the de-skew module, generating the gated control signal according to the control signal and the clock signal.

7. The data transceiver according to claim 6 wherein the control signal is enabled while either the valid signal or the delay signal is enabled.

8. The data transceiver according to claim 6 wherein the delay unit delays the valid signal for a predetermined delay time to generate the at least one delay signal according to a skew amount, and each of the delay signals has a different predetermined delay time.

9. The data transceiver according to claim 8 wherein the skew amount is substantially equal to the maximum transmission difference between the channels of the data transceiver.

10. The data transceiver according to claim 9 wherein if the data transceiver is a single channel data transceiver the skew amount is zero.

11. The data transceiver according to claim 8 wherein the maximum of the predetermined delay time is substantially equal to the skew amount plus one delay time.

12. The data transceiver according to claim 6 wherein the gated control unit comprises a latch for latching the control signal and generating a latched control signal, and the gated control unit enables the gated control signal while both of the clock signal and the latched control signal are enabled.

13. A transmission method for transmitting a packet, having at least one symbol, through a channel, the method comprising:
generating a valid signal, wherein the valid signal is enabled while the symbol of the packet is valid;
generating a gated control signal according to the valid signal and a clock signal; and
de-skewing the packet according to the gated control signal.

14. The method according to claim 13 further comprising:
de-scrambling the packet for determining whether the symbol is valid.

15. The method according to claim 13 wherein the symbol is valid except for a logic idle symbol.

16. The method according to claim 13 further comprising:
delaying the valid signal for a predetermined delay time to generate at least one delay signals according to a skew amount, wherein each of the delay signals has a different predetermined delay time;
generating a control signal according to the valid signal and the delay signal; and
generating the gated control signal according to the control signal and the clock signal.

17. The method according to claim 16 further comprising latching the control signal for generating a latched control signal, wherein the gated control signal is enable while both of the latched control signal and the clock signal are enabled.

18. The method according to claim 16 wherein the control signal is enable while either the valid signal or the delay signal is enabled.

19. The method according to claim 16 wherein the skew amount is substantially equal to the maximum transmission difference between the channels of the data transceiver.

20. The method according to claim 16 wherein the maximum of the predetermined delay time is substantially equal to the skew amount plus one delay time.

* * * * *